W. H. COOK.
STEAM COOKER.
APPLICATION FILED MAY 27, 1912.
1,079,841.
Patented Nov. 25, 1913.
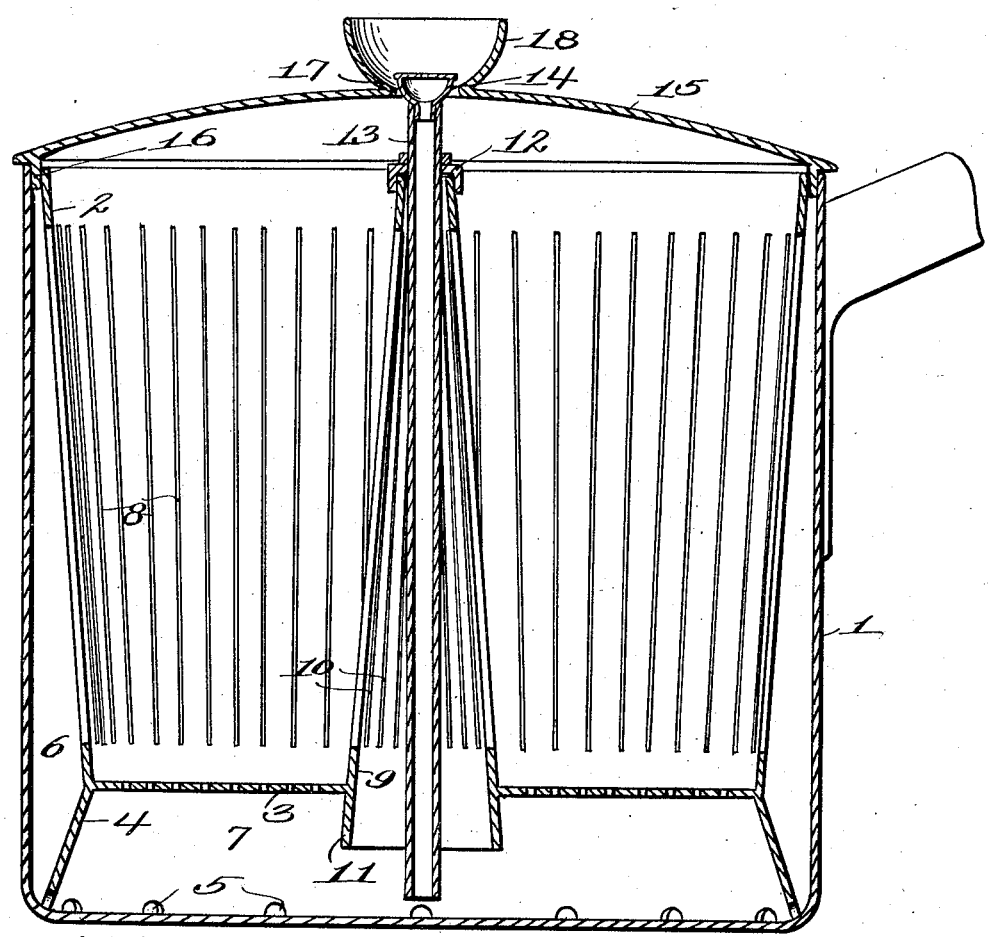
Witnesses:
Inventor
Walter H. Cook.
by
James L. Norris, Jr.
Atty.

UNITED STATES PATENT OFFICE.

WALTER H. COOK, OF NEW ORLEANS, LOUISIANA.

STEAM-COOKER.

1,079,841.   Specification of Letters Patent.   Patented Nov. 25, 1913.

Application filed May 27, 1912. Serial No. 699,969.

*To all whom it may concern:*

Be it known that I, WALTER H. COOK, a citizen of the United States, residing at New Orleans, in the parish of Orleans and State of Louisiana, have invented new and useful Improvements in Steam-Cookers, of which the following is a specification.

This invention relates to improvements in steam cookers and it proposes a construction which is especially applicable to the preparation of rice or other grains which may be cooked by steaming.

The object of the invention is to provide a cooker of simple and accessible construction and by means of which rice or other grains may be systematically and uniformly cooked, steamed, and drained, even by persons who have no experience in the work.

An embodiment of the invention is illustrated in the accompanying drawings, in which the figure is a central vertical sectional view.

The improved cooker comprehends an outer vessel 1 and an inner vessel 2. The vessel 2 is of approximately the same depth as the vessel 1, and includes a perforated bottom 3 from which there extends a downwardly flaring supporting flange 4. The greatest diameter of the flange 4 is nearly equal to the internal diameter of the vessel 1, and it follows that said flange serves also to center the vessel 2 within the vessel 1. The flange 4 is provided with edge openings 5, through which water may circulate from the space 6, intervening between the vessels 1 and 2 to the space 7 under the bottom 3. The body portion of the vessel 2 flares upwardly from the bottom 3, and is provided throughout its extent with relatively narrow closely associated slots 8, which are of considerable length and which provide for the circulation of steam and hot water through the mass that is being cooked.

In order that the cooking and steaming of the mass may be uniform, provision is made for the introduction of steam and hot water to the center of the mass, as well as to the circumference thereof. For this purpose the vessel 2 is preferably provided with a central perforate column 9, preferably a hollow cone, which is formed with closely associated slots 10 of substantially the same proportions as the slots 8 above referred to. The cone 9 is secured to the bottom 3 and the lower imperforate portion 11 of said cone projects downwardly through and beyond said bottom and for some distance into the space 7 and serves to facilitate the passage of steam into and through said cone.

The upper portion of the cone 9 is closed by a cap 12, which serves to prevent any grains of rice, as the latter is being poured into the vessel 2, from entering within said cone, and which, in the instance disclosed, is also utilized as the support for a vertical tube 13. The tube 13 is arranged coaxially of the vessel 2, and its lower portion projects well into the space 7, terminating slightly short of the bottom of the vessel 1. The projecting upper portion of the tube 13 carries a whistle 14 of any well-known formation, or it might be a reed or any other device operable by the escaping steam to emit a sound.

The vessels 1 and 2 are normally closed by a lid 15, the flange 16 of which fits closely between the upper edges of the vessels 1 and 2 and substantially prevents the escape of steam. In order that the lid may be accurately seated, with the end in view above stated, said lid is preferably made relatively heavy, its metal, for instance, being considerably thicker than the metal of the cylinder 1.

The lid 15 is provided with a central opening 17, of somewhat greater diameter than the whistle 14, in order that said lid may be removed when desired without disturbing the whistle 14 of the tube 13. The opening 17 provides for the escape of steam from the vessels, and is arranged centrally of a cup 18 which is secured upon the upper face of the lid 15 and serves to return any condensed moisture that may happen to be carried over with the steam.

In use, the rice, after having been washed, is placed in the vessel 2 and is covered with water, which, of course, passes into the spaces 6 and 7 and into the internal space defined by the cone 9. It may be noted that the slots 8 and 10 and the perforations in the bottom 3, while of sufficient width to provide adequately for the circulation of hot water and steam through the mass, are not of sufficient width to allow any of the grains of rice to pass into the spaces 6 and 7 or the internal space defined by the cone 9. When the cooker has been charged in the manner stated, the cover 15 is placed in position as shown, and the cooker is set upon the stove. As the water commences to boil, the bubbles will find their way through the slots 8 and 10 and the openings in the bottom 3, and will gradually pass up through the mass, ultimately escaping through the opening 17 and in this way the rice will be rapidly and uniformly cooked and steamed. As the water gradually boils away in the process of cooking, the rice remains thoroughly drained. The steaming process is carried on until the water boils away sufficiently to unseal the bottom of the tube 13, at which time steam will escape through said tube and the whistle 14 or equivalent device will sound, thereby giving an indication that the cooking and steaming processes have been completed.

It will be apparent from the foregoing description that the cooker herein described will provide for the rapid cooking and steaming of grain in a systematic and uniform manner, and at the same time, aids materially in effecting the drainage of the water from the grain under treatment, and in effecting the final steaming of said grain.

Having fully described my invention, I claim:

1. In a steam cooker, an outer vessel and an inner vessel, the latter having a perforate body and a perforate bottom spaced from the bottom of the outer vessel, a perforate column arranged centrally of the inner vessel, a tube arranged within said column, a whistle provided on the upper end of said tube, and a cap which closes the upper end of the column and which supports the tube.

2. In a steam cooker for use in the preparation of rice, an outer vessel, an inner rice containing vessel having a perforated bottom and an upwardly flaring body, the inner vessel being so supported concentrically within the outer vessel that its perforated bottom is substantially spaced from the bottom of the outer vessel, and a perforate column arranged within the inner vessel and having its lower end in open communication with the space between the bottoms of said vessels, the flaring body of the inner vessel and the perforate column being provided with closely associated narrow vertical slots selected to promote a continuous circulation of steam and a continuous drainage of the cooking mass and to prevent the escape of rice from said inner vessel.

In testimony whereof I have hereunto set my hand in presence of two subscribing witnesses.

WALTER H. COOK.

Witnesses:
CHARLES H. NASH,
ROBERT WATERMAN.

Copies of this patent may be obtained for five cents each, by addressing the " Commissioner of Patents, Washington, D. C."